Patented May 8, 1928.

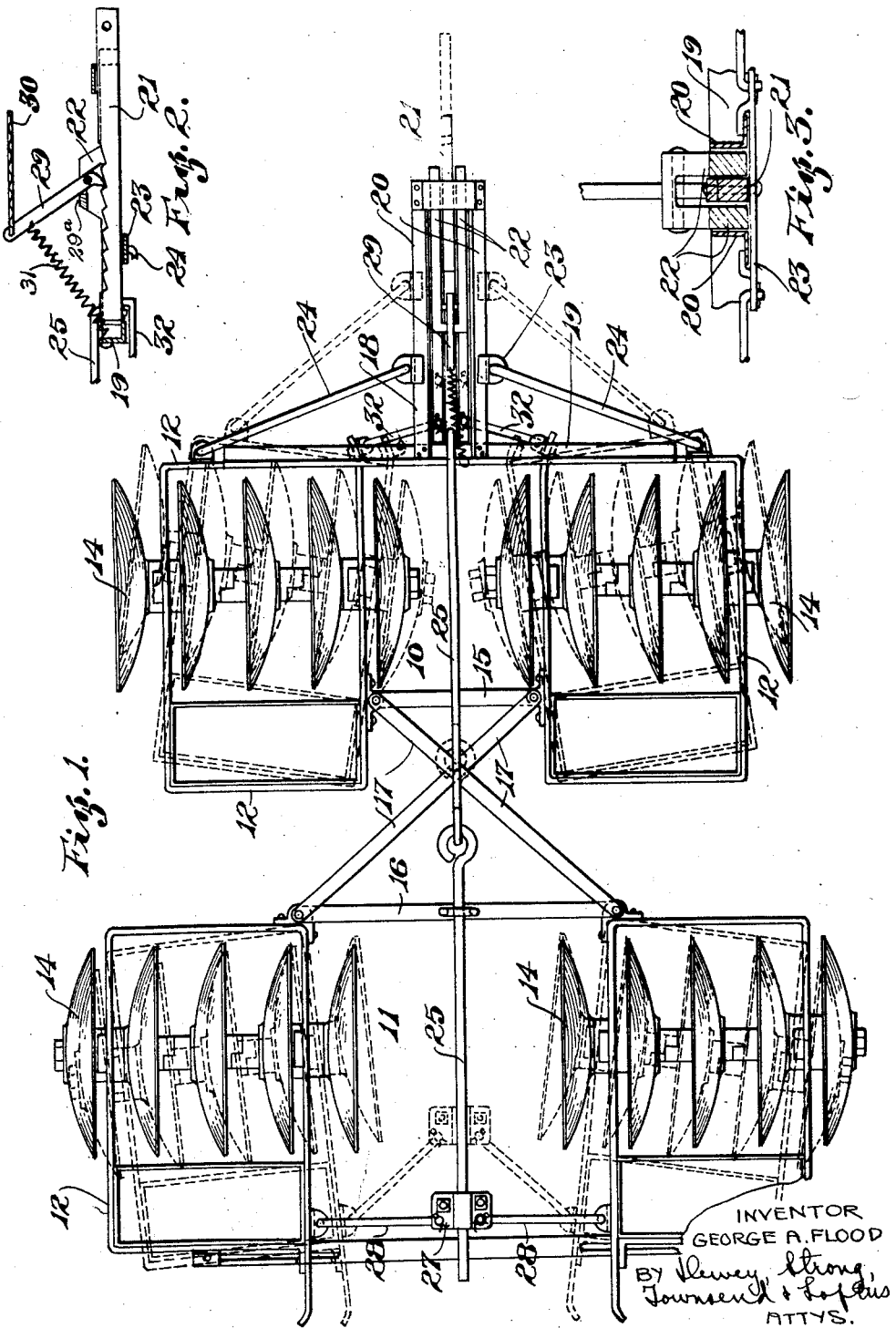

1,669,081

UNITED STATES PATENT OFFICE.

GEORGE A. FLOOD, OF LOS ANGELES, CALIFORNIA, ASSIGNOR OF ONE-FOURTH TO ROBERT I. KNAPP AND ONE-FOURTH TO HORACE G. KNAPP, BOTH OF SAN JOSE, CALIFORNIA.

DISK HARROW.

Application filed June 10, 1925. Serial No. 36,100.

This invention relates to agricultural implements and particularly pertains to disk harrows.

It is the principal object of the present invention to generally improve apparatuses of the character referred to, whereby to provide a disk harrow wherein the forward and rear gangs are connected in a manner causing them to track during the turning of the harrow, and which is equipped with improved mechanism capable of being entirely controlled from the tractor pulling the harrow, for angling the gangs of disks and so vary the effectiveness of the harrow.

In carrying out this object, I provide front and rear sets of gang frames carrying harrow disks. These frames are connected together and with the drawbar in a manner whereby movement of the latter relative to the frames may be utilized to angularly adjust the position of all the gangs relative to the line of draft of the harrow. A latching mechanism is provided to control the movement of the drawbar relative to the gangs to permit the operator on the tractor to adjust the angularity of the disks to suit conditions. I also provide means for adjusting the angular positions of the forward and rear gangs with relation to each other. These front and rear gangs are connected with each other by a mechanism causing them to track when the harrow is turning and thereby preventing the disks from being scraped sidewise and in this way scoop up and displace the top soil.

One form which the invention may assume is exemplified in the following description and illustrated by way of example in the accompanying drawings, in which:

Fig. 1 is a view in plan of a harrow embodying the invention and disclosing the operating position of the disks and associate mechanism in dotted lines.

Fig. 2 is a fragmentary view in longitudinal section disclosing the drawbar construction.

Fig. 3 is a transverse section through the drawbar mechanism.

Referring more particularly to the accompanying drawings, Fig. 1 discloses a disk harrow having forward and rear sets of gangs 10 and 11. Each set consists of two aligned gangs located upon opposite sides of the line of draft of the harrow. These gangs are provided with separate gang frames 12 in which an axle is journalled to carry the harrow disks 14 which are normally disposed substantially parallel to the line of draft.

The gang frames of each set are connected at their inner ends by transverse links 15 and 16. These links are pivoted at their ends to inner corners of the gang frames. At these pivotal points, diagonal links 17 are pivoted and extend diagonally from the inner corners of the forward gang frames to the inner corners of the gang frames of the rear set. The pivotal points of these links are the points about which the gang frames swing when they are swung to adjust the angular position of the disks relatively to the line of draft of the harrow.

The diagonal connecting links 17 also cause proper turning movement of the rear set of gangs relatively to the forward set when the harrow is turned, thus causing the gangs to track and preventing the disks from being scraped sidewise upon the turning of the harrow.

At the forward end of the front set of gangs, I provide a drawbar frame 18 which comprises a transverse bar 19 and a pair of parallel longitudinal bars 20. The latter are rigidly connected to the transverse bar at their inner ends and extend forwardly. These bars are located upon opposite sides of the longitudinal center line of the harrow and are spaced apart to slidingly accommodate a drawbar 21 and a latch bar 22. A yoke 23 is secured on the former and is slidably mounted on the longitudinal bars 20 of the drawbar frame 18. This yoke 23 is pivotally connected with the inner ends of front draw links 24 which extend outwardly and pivotally connect with the outer front corners of the gang frames of the forward set. By this connection, any pull exerted on the drawbar 21 will be transmitted through the yoke 23 and the links 24 to the front set of gangs.

The drawbar 21 is connected with a draw rod 25 which extends rearwardly to connect the drawbar with the rear set of gangs.

This draw rod 25 is jointed due to the relative swinging of the sets occurring when the harrow is turned. The rear end of the draw rod 25 is fitted with a clamp 27 which is normally secured thereon. Rear draw links 28 are pivoted at their inner ends to the clamp 27 and at their outer ends to the inner rear corners of the gang frames of the rear set.

As the front draw links 24 are connected with the outer front corners of the gangs of the forward set, and the rear draw links 28 are connected with the inner rear corners of the rear set, movement of the drawbar relative to the gangs will swing the opposed front and rear gang frames about their pivotal points in opposite directions and dispose the disks at a proper angle to the line of draft or parallel thereto as the case may be.

After the drawbar has been adjusted to angle the disks, it is necessary to proper operation to latch it to prevent further pull from changing the angle of the disks. The latching is accomplished by the provision of a vertically disposed latch lever 29 which is pivoted to the latch bar 22 above the drawbar for swinging movement in a plane parallel to the line of draft. The upper end of this lever may be connected by a rope or rod 30 which may be led to the tractor for operation by the driver thereof. The lower end of the latch lever 29 is adapted to engage ratchet teeth formed in the upper surface of the drawbar 21. The working faces of the ratchet teeth on the drawbar 21 are disposed at such an angle that forward movement of the upper end of the lever 29 will disengage the pawl like lower end of the lever from these teeth. Rearward movement of the upper end of the lever 29 is prevented by an abutment 29$^a$ which acts to prevent a pull on the drawbar from moving the upper end of the lever 29 rearwardly and thus normally holding the pawl like lower end of the lever 29 in engagement with the ratchet teeth. It is believed clearly disclosed in Fig. 3 that a forward pull exerted on the upper end of the lever 29 will cause its lower pawl like end to slide over the angularly disposed working faces of the ratchet teeth and disengage therefrom. The latch lever is normally held engaged with these teeth by a tension spring 31. Engagement of the lower end of the lever 29 with the ratchet teeth and the lever's engagement with the abutment 29$^a$ prevents a forward pull on the drawbar from moving the latter relative to the latch bar and maintains the adjustment of the disks.

The inner end of the latch bar 22 is connected with short links 32. These links extend outwardly and are pivotally connected to the inner front corners of the gang frames of the forward set. The difference in length and position of the draw links 24 and the links 32 results in a binding action when the drawbar and latch bar are held from relative movement and provides a draft connection between the drawbar and the front set of gangs.

In operation of the device, the drawbar 21 is connected with the rear of a tractor (not shown) and a rope or rod 30 is led from the latch lever 29 to the tractor.

Assuming that the disks are in parallel relation, if it is desired to angle the disks the rope or rod 30 is manipulated to release the engagement between the drawbar 21 and the latch bar 22. Forward movement of the tractor will then cause relative movement of the drawbar with respect to the disk gangs and to the latch bar 22 and cause the gang frames to swing about their pivots as previously described. When the disks have assumed a sufficient angle, the rope 30 is released to allow the spring 31 to re-engage the latch lever with the ratchet teeth on the drawbar 21 to prevent further relative movement between the drawbar and the latch bar. This latches the gang frames into their set position as described and allows the harrow to be properly operated.

When it is desired to again place the disks in parallel relation for transportation of the harrow or other purposes, it is only necessary to back the tractor. This will move both the drawbar and the latch bar rearwardly and through the links 24 and 32 and the rear draw links swing the gang frames to normal or parallel relation. As soon as the tractor has been backed sufficiently to accomplish this, it may be reversed and driven forwardly as the latch bar will automatically prevent relative movement between the drawbar and latch bar and thereby hold the gang frames in a set position.

It is obvious that when the tractor is backing it is unnecessary to manipulate the latch lever inasmuch as the teeth on the drawbar are ratchet-like and will not engage with the latch lever when moved rearwardly with relation to the latch lever.

When turning the harrow, the rear set will be caused to track due to the provision of the diagonal links 17. This will prevent the disks from being scraped sidewise and thereby displace the top soil.

When it is desired to adjust the angular position of the disks of the rear set with relation to those of the front set, it is only necessary to release the clamp 27 and adjust its position along the draw rod 25 and again secure it to the draw rod. In this way the disks of the rear set may be arranged so that they will be pitched to greater or lesser angles than the front set when the gangs are operated from the tractor.

From the foregoing it is obvious that a comparatively simple and efficient disk harrow has been provided which is inexpensive to manufacture and which may be entirely controlled from the tractor connected therewith.

It will be noticed that the gang frames are formed of a single bar of metal bent into proper form. This is an advantage over prior structures as it is very rigid and reduces manufacturing costs.

While I have shown the preferred form of my invention, it is to be understood that various changes in its construction may be made without departing from the spirit of the invention as defined in the appended claims.

Having thus described my invention, what I claim and desire to secure by Letters Patent is:

1. A disk harrow comprising forward and rear sets of disk gangs, each set comprising gangs located upon opposite sides of the line of draft, transverse connections connecting the inner corners of the gangs of each set, diagonal members pivoted at their ends to the connecting points of the gangs and transverse connections and connecting said sets of gangs together.

2. A disk harrow comprising forward and rear sets of gangs of disks, each set comprising gangs located upon opposite sides of the line of draft, coupling means for connecting the front and rear gangs together, the gangs of each set being connected and adapted to swing relatively to each other, a draft mechanism including a drawbar, links connecting said drawbar with the outer front corners of the gangs of the forward set and with the inner rear corners of the gangs of the rear set whereby longitudinal movement of the drawbar relative to the gangs will adjust the angular position of the gangs with respect to the line of draft, and means for adjusting the angular position of the gangs of the rear set independently of the gangs of the front set.

3. A disk harrow comprising forward and rear sets of disk gangs, each set comprising gangs located upon opposite sides of the line of draft, coupling means for connecting the front and rear gangs together, the gangs of each set being adapted to swing relatively to each other, a draft mechanism comprising a drawbar, links connecting said drawbar with the outer front corners of the gangs of the forward set and with the inner rear corners of the gangs of the rear set whereby longitudinal movement of the drawbar relative to the gangs will adjust the angular position of the gangs with respect to the line of draft, means for adjusting the angular position of the gangs of the rear set independently of and relative to the gangs of the front set, latching means associated with the drawbar and effective against forward movement of the drawbar to prevent relative movement of the drawbar with respect to the gangs, said latching mechanism being capable of operation from a remote point and being effective against forward movement of the drawbar only.

4. A disk harrow comprising forward and rear sets of disk gangs, each set comprising gangs located upon opposite sides of the line of draft, coupling means for connecting the front and rear gangs together, the gangs of each set being adapted to swing relatively to each other, a draft mechanism comprising a drawbar, links connecting said drawbar with the outer front corners of the gangs of the forward set and with the inner rear corners of the gangs of the rear set whereby longitudinal movement of the drawbar relative to the gangs will adjust the angular position of the gangs with respect to the line of draft, a latch bar associated with the drawbar, links connecting the latch bar with the inner front corners of the forward gangs whereby forward movement of the drawbar relative to the latch bar and gangs will cause angling of the gangs, and operative latching means associated with the latch bar and the drawbar to prevent relative movement of the drawbar with respect to the latch bar in one direction and thereby cause said gangs to be maintained in their set position, said latching means being ineffective against movement of the drawbar with respect to the latch bar in the other direction.

5. A disk harrow comprising forward and rear sets of disk gangs, each set comprising gangs located upon opposite sides of the line of draft, and angularly adjustable, coupling means for connecting the front and rear gangs together, each gang having a frame, a drawbar structure comprising a drawbar, a latch bar associated therewith, a jointed draw rod connected at one end with the drawbar and extending rearwardly, links pivotally connecting the drawbar to the outer front corners of the forward gang frames, links connecting the inner front corners of the forward gang frames to the latch bar whereby forward movement of the drawbar relative to the latch bar and gangs will angularly adjust the position of the gang frames in unison, operative latch means associated with the latch bar and drawbar whereby to prevent forward relative movement of the drawbar and latch bar, and thereby maintain the gang frames in a set position.

6. A disk harrow comprising forward and rear sets of disk gangs, each set comprising gangs located upon opposite sides of the line of draft and angularly adjustable, coupling means for connecting the front and rear gangs together, each gang having a frame, a drawbar structure comprising a drawbar, a latch bar associated therewith, a jointed draw rod connected at one end with the drawbar and extending rearwardly, links pivotally connecting the drawbar to the outer front corners of the forward gang frames, links connecting the inner front corners of the forward gang frames to the latch bar whereby forward movement of the drawbar relative to the latch bar and gangs will angularly adjust the position of the gang frames in unison, operative latch means associated with the latch bar and drawbar whereby to prevent forward relative movement of the drawbar and latch bar, and thereby maintain the gang frames in a set position, said latching means being capable of operation from a remote point and being effective against forward movement of the drawbar only.

GEORGE A. FLOOD.